United States Patent [19]
Degi

[11] Patent Number: 5,461,491
[45] Date of Patent: Oct. 24, 1995

[54] PROCEDURE FOR REDUCING PROCESSING TIME FOR IMAGE ELEMENTS BY COMBINING CHARGE OF ADJACENT PIXELS INTO A NEW COMPOSITE PIXEL

[75] Inventor: Greg A. Degi, Fort Collins, Colo.

[73] Assignee: Hewlett-Packard Company, Palo Alto, Calif.

[21] Appl. No.: 174,868

[22] Filed: Dec. 29, 1993

[51] Int. Cl.[6] .............................. H04N 1/028; H04N 1/04
[52] U.S. Cl. ........................ 358/482; 358/483; 257/234; 250/208.1; 348/298
[58] Field of Search .................................. 257/225, 234; 358/483, 482, 494, 496, 497, 494, 475; 377/58, 63; 250/208.1; 348/297, 298, 311

[56] References Cited

U.S. PATENT DOCUMENTS

| | | | |
|---|---|---|---|
| 3,919,468 | 11/1975 | Weimer | 257/225 |
| 4,313,138 | 1/1982 | Kanda et al. | 358/482 |
| 4,450,484 | 5/1984 | Terakawa et al. | 348/311 |
| 4,597,092 | 6/1986 | Furusawa et al. | 377/63 |
| 4,775,799 | 10/1988 | Milch et al. | 358/483 |
| 4,845,540 | 7/1989 | Baker et al. | 348/297 |
| 5,136,402 | 8/1992 | Nagano | 358/483 |

*Primary Examiner*—Scott A. Rogers

[57] ABSTRACT

The present invention improves the scanning speed (i.e., the line exposure time) of an image scanner that is operated at a lower than normal resolution. The image scanner contains a charge coupled device (CCD) that stores a plurality of pixel charges. Before digitizing the pixel charges, the present invention combines two or more of these pixel charges. Thus, the effective resolution of the CCD can be divided by a designated amount, thus reducing processing time and keeping signal levels nearly constant.

11 Claims, 2 Drawing Sheets

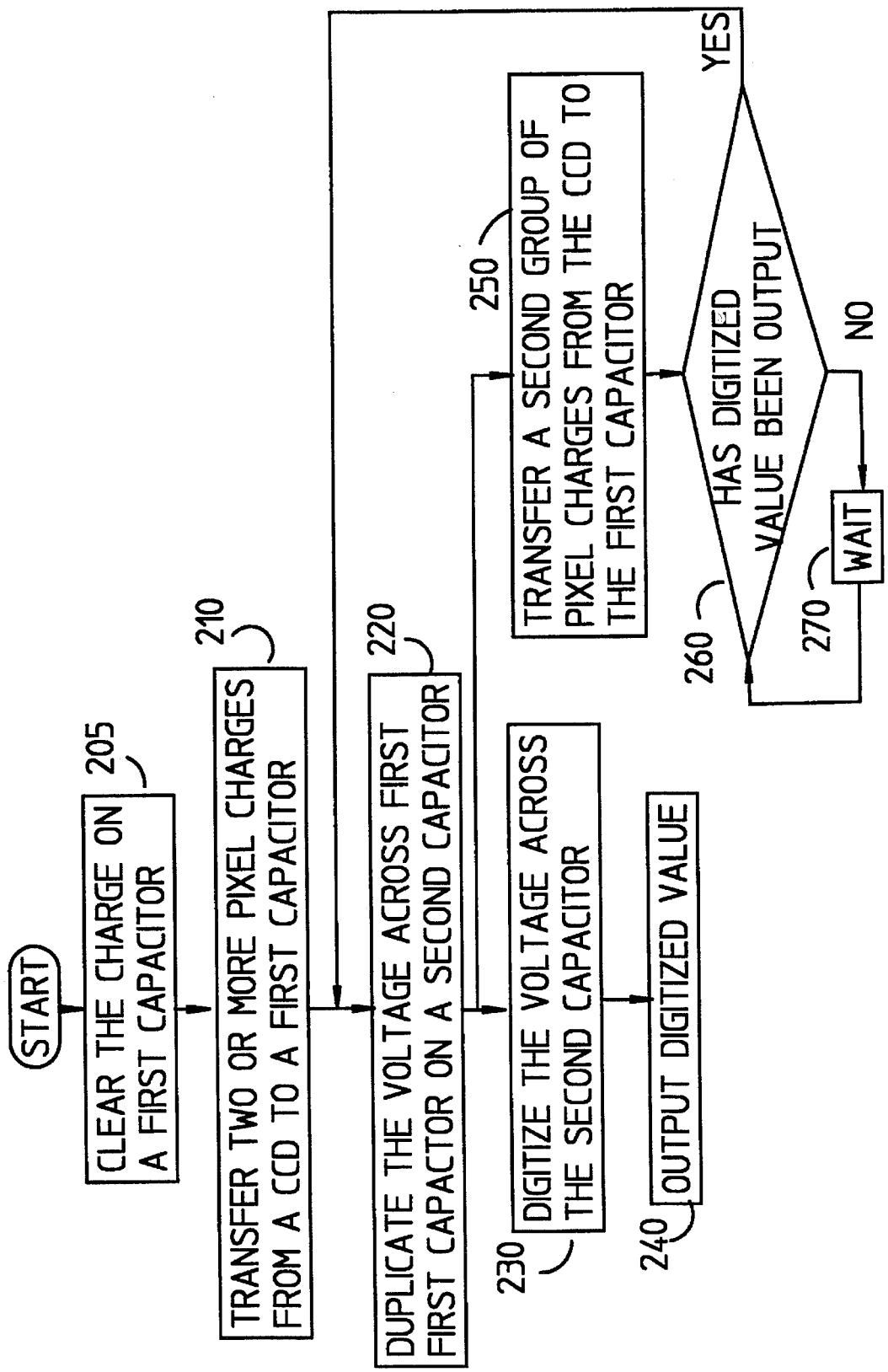

PROCEDURE FOR REDUCING PROCESSING TIME FOR IMAGE ELEMENTS BY COMBINING CHARGE OF ADJACENT PIXELS INTO A NEW COMPOSITE PIXEL

BACKGROUND OF THE INVENTION

1. Field of the Invention

The present invention relates generally to image scanner technology and, more specifically, to a system and method for improving the scanning speed while maintaining the output resolution of the image scanner.

2. Discussion of Related Art

Digitizing image scanners are often used to digitize documents so they can be manipulated using a computer. For example, a scanner can be used to digitize text and put it into a format recognized by a word processing program so that an editor can rewrite or modify the document.

With advances in processor speed and scanner technology, it has become advantageous to also digitize pictorial images as well as printed text. In an effort to enhance scanner performance, developers have sought ways to optimize the number of pixels used to represent a digital image. A simple reduction in the number of pixels used to represent an image results in a reduction in image resolution. An increase in the number of pixels results in greater processor time required to digitize the image and perform subsequent image processing.

One of the most useful integrated devices is the charge-coupled device (CCD). The CCD is part of a broader class of structures known generally as charge transfer devices. These are dynamic devices which move charge along a predetermined path under the control of clock pulses. These devices find applications in memories, various logical functions, signal processing, and in imaging (e.g., image scanners).

The CCD stores a charge referred to herein as a pixel charge. The pixel charge stored in the CCD 120 is produced by a light sensitive diode (not shown). The amount of charge the light sensitive diode stores into the CCD is a function of how much light is hitting the light sensitive diode and the time of exposure to the light. Cutting the time of exposure in half results in half the charge being stored in the CCD. The (analog) pixel charge stored in the CCD is shifted out of the CCD and digitized into a digital value.

Scanning speed is often paced by how fast pixels in an image can be converted into digital form. When scanning at lower than maximum resolution, traditionally all of the raw pixel elements of a CCD are processed even if only every other pixel will be used. When scanning at a lower resolution, particularly a resolution that is less than half of the native resolution of the scanner, it is inefficient to have to process every pixel when many of the processed values will be discarded. If the shift rate of the CCD is doubled and only every other pixel charge is sampled (assuming a resolution of one half is desired), the time to digitize the pixel charges would remain constant while the time to shift out a line of pixel charges is reduced by a factor of two.

The drawback to this method is that the exposure time (and hence signal level) is equal to the time it takes to shift out a line of pixel charges from the CCD when scanning as fast as possible. This means that the signal to be digitized will be half the level it was at the slower speed and with constant system noise, the signal to noise level will be degraded by a factor of two.

As such, it would be desirable to have a procedure for increasing the scanning speed of an image scanner while still maintaining image quality of the image when less than full resolution is needed.

SUMMARY OF THE INVENTION

The present invention improves the scanning speed (i.e., the line exposure time) of an image scanner that is operated at a lower than normal resolution. In a preferred embodiment, the effective resolution of the CCD can be divided by a designated amount (e.g., an integer), thus reducing processing time and keeping signal levels nearly constant.

The present invention provides a circuit and method of using the same for converting pixel charges stored in a charge coupled device (CCD), wherein the CCD is adapted to store a plurality of pixel charges. Connected to the CCD is digitizing logic that digitizes the plurality of pixel charges. The digitizing logic includes a charge to voltage converter block, a sample and hold block, and an A/D converter. In operation, the present invention transfers a first group of two or more pixel charges from the CCD to a first capacitor within the charge to voltage converter block to provide a voltage proportional to said first group of two or more pixel charges. Next, the voltage across the first capacitor is duplicated on a second capacitor within the sample and hold block. Finally, the voltage is digitized by the A/D converter to produce a digitized value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 illustrates an operational flowchart of the present invention.

DETAILED DESCRIPTION OF THE PRESENT INVENTION

Figure 1:
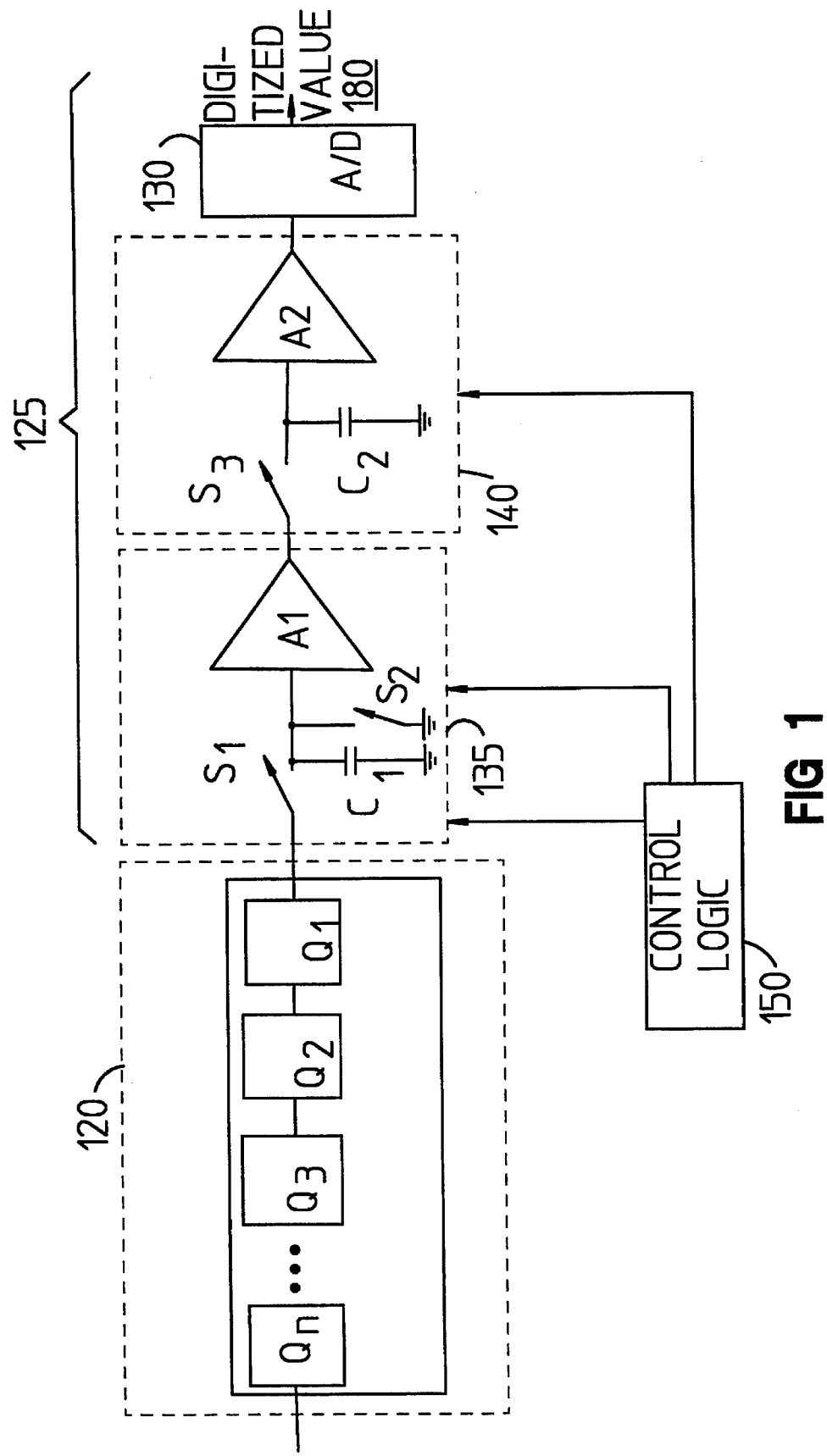
FIG. 1 illustrates a CCD and a circuit for converting pixel charges stored in the CCD.

FIG. 1 shows a circuit 125 for converting pixel charges stored in a charge coupled device (CCD) 120. The CCD 120 includes n pixel elements Q1, Q2, Q3, and Qn, each of which is referred to as a bucket. Each bucket Q1–Qn holds a pixel charge. The CCD 120, generally, is an analog shift register. The analog values are embodied by variable amounts of charge that are shifted from bucket to bucket until it finally reaches the last bucket in the CCD 120. The next shift will cause the charge to go outside the CCD 120. The charge is then typically converted to a voltage by placing the charge on a known capacitor and using the resulting voltage as the embodiment of the analog value.

The circuit 125 includes a charge to voltage converter block 135, a sample and hold block 140, and an A/D converter 130. Each of these blocks represents a stage in the conversion process (i.e., conversion from analog pixel charge to digital signal). The charge to voltage converter block 135 includes switch S1, switch S2, capacitor C1, and operational amplifier A1. The sample and hold block 140 includes switch S3, capacitor C2, and operational amplifier A2. The operational amplifiers A1 and A2 act as isolation buffers to keep subsequent stages from loading the current stage.

The analog to digital converter 130 (A/D converter 130) has a conversion time of $T_c$. If the number of buckets equals n (n equals four in FIG. 1), then the line exposure time equals $T_c*n$. In a typical scanner, n is of the order of approximately 5,000.

The present invention improves the scanning speed (i.e., the line exposure time) of an image scanner that is operated at a lower than normal resolution. In a preferred embodiment, the effective resolution of the CCD can be divided by a designated amount (e.g., an integer), thus reducing processing time and keeping signal levels nearly constant. This technique is preferred to just shifting the buckets Q1 to Qn in the CCD 120 twice as fast and sampling every other pixel (as described in the background section) since by combining two pixels together a larger signal is obtained improving signal to noise ratio, and a slight blurring of the image comes from combining two pixels reducing problems from aliasing high frequencies in the image.

In normal operation, the charge from the next pixel in the CCD (i.e., the charge stored in bucket Q1) is clocked onto the capacitor C1, and the resultant voltage across the capacitor C1 is transferred (e.g., clocked) to the sample and hold block 140 (i.e., switch S3 and capacitor C2). This cycle is repeated for each bucket in the CCD 120.

Using circuit 125, the procedure for digitizing a plurality of pixels with full resolution is outlined below. Initially switches S1 and S3 are opened, and switch S2 is closed. This eliminates any charge on capacitor C1. Next, switch S2 is opened and switch S1 is closed. As this time, the pixel charges stored in buckets Q1–Qn are shifted one bucket to the right. This places the charge that was in bucket Q1 onto capacitor C1. This results in a voltage given by Q/C.

Switch S3 is closed once capacitor C1 is charged. Once switch S3 is closed, the voltage across capacitor C2 is equal to the voltage across capacitor C1. Next, switch S3 is opened and the voltage across capacitor C2 remains relatively constant. Finally, the voltage across capacitor C2 is converted into a digitized value 180 by the A/D converter 130. The above procedure is followed for each pixel bucket Q1–Qn.

The digitized value 180 can then be used for further digital signal processing of a source image, ultimately resulting in a digital representation of the source image. That is, the digitized value can be used to incorporate images into printed documents, convert an image of a text page into a computer representation of the text, or a host of other applications.

Note that the processing of the next pixel bucket can begin while the previous bucket is being converted from analog to digital. However, the conversion process must be completed before switch S3 is closed again. Furthermore, the sample and hold block 140 is not necessary if the A/D converter 130 is fast enough to digitize the voltage before the next pixel charge is shifted onto capacitor C1.

The time to do one iteration of the above procedure (i.e., process one bucket) is limited to $T_c$. Cutting the time to do one iteration of the above procedure in half results in a converted pixel charge that is half the original charge. Hence there is a smaller signal to convert (i.e., loss of resolution) and the A/D converter 130 must be twice as fast.

If the full resolution of the CCD 120 is not needed, the following cycle which is outlined in detail below can be used. Initially, the charge on capacitor C1 is cleared. Next, the charge from a first pixel in the CCD is clocked onto the capacitor C1, the charge from a second pixel is clocked onto the capacitor C1, and so on, without removing the charge from earlier pixels. Now, when the desired number of pixels have been combined (i.e., two or more), the output voltage across capacitor C1 is duplicated in the sample and hold block 140. Finally, the voltage in the sample and hold block 140 is digitized. This cycle is repeated as required for each group of two or more buckets in the CCD 120.

Since the conversion only occurs once for every two CCD shifts, the conversion rate can be held constant and the CCD rate doubled. This results in a line exposure time that is half of what it was before, reducing the charge on each pixel by a factor of two. Outlined in detail below is a procedure for digitizing a plurality of pixels that improves upon the line exposure time while maintaining the output image quality. FIG. 2 illustrates a high level flowchart of the procedure.

Referring to FIG. 1 and 2 concurrently, initially switches S1 and S3 are opened and switch S2 is closed. Once again this eliminates any charge that is on capacitor C1. This step is shown in block 205. Next, switch S2 is opened and switch S1 is closed. Next, the pixel charges stored in pixel buckets Q1–Qn are shifted one bucket to the right. This places the pixel charge that was in bucket Q1 onto capacitor C1. Next, the pixel charges stored in pixel buckets Q1–Qn are shifted right once again. The charge on capacitor C1 is now equal to the sum of the charges that were in buckets Q1 and Q2 initially. Thus, if the charge in bucket Q1 was Q1/2 and the charge in bucket Q2 was Q2/2, the voltage across capacitor C1 is now ((Q1+Q2)\2)\C1. This process is repeated for two or more pixels depending on the specific resolution required. These steps are shown in block 210.

Next, switch S3 is closed. Once switch S3 is closed the voltage on capacitor C2 now matches the voltage on capacitor C1. Next, switch S3 is opened and the voltage across capacitor C2 remains constant. These steps are shown generally in block 220. Finally, the voltage across capacitor C2 is converted into a digital value 180 by the A/D converter 130, as shown in block 230 and block 240. The above procedure is followed until the entire line of pixel charges has been shifted out.

Control logic 150 is provided to generate the necessary control signals to control circuit 125 and the necessary clock signal to control CCD 120 as outlined above. In particular, Control logic 150 is connected to the CCD 120 to provide a clock pulse to control the shifting of buckets Q1 to Qn. Control logic 150 is also connected to the charge to voltage converter block 135 to control the operation of switches S1 and S2 and connected to the sample and hold block 140 to control switch S3. Finally, the control circuit is connected to the A/D converter 130. Those skilled in the relevant art will readily appreciate the various circuits that could be generated for providing these control signals.

Once again, note that the processing of the next two or more pixel buckets can begin while the previous pixel charges are being converted from analog to digital. However, the conversion process must be completed before switch S3 is closed again. This aspect of the present invention is shown in blocks 250–270.

Since only one conversion is performed for every two (or more) pixel charges, the conversion time $T_c$ stays the same. However, since two pixels (e.g., Q1 and Q2) each having a charge one half its original charge are combined, the signal level stays the same as "slow speed" (i.e., normal or high resolution scanning), but the resolution goes down by half. By combining the charge of pixels before conversion by the A/D converter 130, fewer pixels Q1–Qn need to be converted. Just converting half of the pixels results in the exposure time for each line being halved. However, since two or more pixels are combined before conversion by the A/D converter 130, the signal level (i.e., the output of operational amplifier A2 and the output of A/D converter 130) remains nearly constant.

While the invention has been particularly shown and described with reference to preferred embodiments thereof, it will be understood by those skilled in the art that various changes in form and details may be made therein without departing from the spirit and scope of the invention.

What is claimed is:

1. A method for shortening the overall time required to digitize an image at less than full resolution, where the image is represented by a plurality of pixel charges that are stored in a charge-coupled device, comprising the steps of:

(1) reducing the charge-coupled device image exposure time to a value less than that of normal operation;

(2) transferring a first group of two or more pixel charges from the charge-coupled device to a first capacitor to provide a voltage proportional to said first group of two or more pixel charges; and (3) digitizing said voltage to produce a digitized value.

2. The method of claim 1, wherein said first voltage is digitized with an analog to digital converter.

3. The method of claim 1, further comprising the step of transferring a second group of two or more pixel charges from the charge-coupled device to said first capacitor before said first voltage is digitized.

4. The method of claim 1, wherein steps 2 and 3 are repeated until the plurality of pixel charges stored in the charge-coupled device has been digitized, whereby said exposure-time reducing step and said charge-group transferring step result in reduced overall image digitization time without degraded signal-to-noise ratio.

5. A method for shortening the overall time required to digitize an image at less than full resolution, where the image is represented by a plurality of pixel charges that are stored in a charge-coupled device, comprising the steps of:

(1) reducing the charge-coupled device image exposure time to a value less than that of normal operation;

(2) transferring a first group of two or more pixel charges from the charge-coupled device to a first capacitor to provide a first voltage proportional to said first group of two or more pixel charges;

(3) duplicating said first voltage from said first capacitor on a second capacitor; and (4) digitizing said first voltage to produce a digitized value.

6. The method of claim 5, wherein steps 2, 3 and 4 are repeated until the plurality of pixel charges stored in the charge-coupled device has been digitized, whereby said exposure-time reducing step and said charge-group transferring step result in reduced overall image digitization time without degraded signal-to-noise ratio.

7. A system for digitizing a plurality of pixel charges, comprising:

(a) a charge-coupled device adapted to store a plurality of pixel charges, wherein each of said plurality of pixel charges is stored in a bucket;

(b) digitizing logic, coupled to said charge-coupled device, for digitizing said plurality of pixel charges, wherein said digitizing logic includes,
      (i) a first capacitor for storing a group of two or more of said plurality of pixel charges;
      (ii) a sample and hold circuit, coupled to said first capacitor, adapted to transfer and hold said group of two or more of said plurality of pixel charges;
      (iii) an analog to digital converter, coupled to said sample and hold circuit, adapted to digitize said group of two or more of said plurality of pixel charges;
      (iv) clocking means for controlling the transfer of said group of two or more of said plurality of pixel charges from said charge-coupled device to said first capacitor; and (c) timing means, coupled to said charge-coupled device, for adjusting the charge-coupled device image exposure time to a value inversely proportional to the number of pixel charges stored on said first capacitor.

8. The system of claim 7, wherein said group of two or more of said plurality of pixel charges are transferred to said first capacitor during the digitizing of another group of pixel charges.

9. A method for shortening the overall time required to digitize an image at less than full resolution, where the image is represented by a plurality of pixel charges that are stored in a charge-coupled device, comprising the steps of:

(1) adjusting the charge-coupled device image exposure time to a value less than that of normal operation, inversely proportional to the number of pixel charges to be stored on a first capacitor;

(2) transferring a group of two or more pixel charges from the charge-coupled device to said first capacitor to provide a voltage proportional to said first group of two or more pixel charges; and (3) digitizing said voltage to produce a digitized value.

10. The method of claim 9, further comprising the step of duplicating said first voltage from said first capacitor on a second capacitor, wherein said voltage on said second capacitor is digitized by step (3).

11. The method of claim 9, wherein steps 2 and 3 are repeated until the plurality of pixel charges stored in the charge-coupled device has been digitized, whereby said exposure-time reducing step and said charge-group transferring step result in reduced overall image digitization time without degraded signal-to-noise ratio.

* * * * *